United States Patent Office 3,424,692
Patented Jan. 28, 1969

3,424,692
METHOD FOR PREPARING VANADATE PHOSPHORS
Sam Z. Toma, Towanda, James E. Mathers, Ulster, and Felix F. Mikus, Towanda, Pa., assignors to Sylvania Electric Products Inc., a corporation of Delaware
No Drawing. Filed Apr. 22, 1966, Ser. No. 544,390
U.S. Cl. 252—301.4       5 Claims
Int. Cl. C09k 1/44

ABSTRACT OF THE DISCLOSURE

The particle size of a vanadate phosphor can be controlled by adding potassium cations to the blend of raw materials used to make up the phosphor.

---

This invention relates to a method of producing improved yttrium and/or gadolinium vanadate phosphors. More specifically, this invention relates to a method of preparing such phosphors wherein the particle size is controlled within desired parameters.

Yttrium and gadolinium vanadadate phosphors are known to the art and methods have previously been developed for their production. Today, they find their greatest applicability in cathode-ray tubes as a red-emitting component of a three color screen. In the manufacture of the phosphor screens, great care must be taken to control the particle sizes of the phosphor. Manufacturing techniques commonly used require a narrow size distribution of the particles and unless this narrow spread is attained, the screen will not operate at maximum efficiency.

To obtain particles of a desired size, the art generally ball milled the phosphors for extended periods of time in order to reduce any large particles to within usable limits. But ball milling reduces the particle size of all particles indiscriminately. Large particles were broken into smaller ones, but those which already have small sizes were reduced into fines. Large quantities of fines in the phosphor can be highly disadvantageous. On the other hand, it is possible to remove the large particles and fines by techniques such as elutriation, but these processes tend to be rather expensive and wasteful. Hence, it is desirable to produce a phosphor in specific particle size ranges by processing techniques, so that operations such as ball milling and/or elutriation steps can be eliminated.

To this end, we have discovered that the addition of potassium cations to the yttrium and/or gadolinium vanadate phosphor-forming raw material mixture will decrease the particle size to a desired extent. Moreover, such additions do not effect the efficiency of the phosphor when added in controlled quantities and in some cases may even enhance body color. After firing, the potassium cations are washed out of the phosphor.

The primary object of our invention is to produce yttrium and gadolinium vanadate phosphors in a desired particle size range without substantially changing the efficiency of the phosphor.

A feature of our invention is the addition of potassium cations in controlled quantities to a yttrium and/or gadolinium vanadate phosphor forming raw material formulation.

The many other objects, features and advantages of our invention will become manifest to those conversant with the art upon reading the following specification.

According to our invention, the raw materials necessary to formulate a yttrium and gadolinium vanadate phosphor are mixed together and 0.01 to 0.50 mole percent of potassium cation are added per mole of $YVO_4$. The particular anion which is added seems to have little or no effect upon the overall process. The nitrate, nitrite, perchlorate, chlorate, chloride, silicate, oxalate, hydroxide, carbonate, phthalate and vanadate of potassium give substantially similar results. Table I, following, shows how the particle size of the phosphor is reduced when quantities of potassium flux are added to the raw material blend. In each case, as the amount of potassium is increased, the particle size is reduced. However, the potassium concentration must not be so great as to reduce appreciably the brightness of the phosphor and hence, must be in the described ranges. The particles will be less than 8 microns.

TABLE I

| Percent K wt. | Mole K/mole $YVO_4$ | FSSS |
|---|---|---|
| 0 | 0 | 8.3 |
| 0.64 | 0.0335 | 6.6 |
| 1.28 | 0.0670 | 6.1 |
| 2.55 | 0.1340 | 5.9 |
| 3.83 | 0.2010 | 5.4 |
| 5.10 | 0.2680 | 4.9 |
| 8.3 | 0.3350 | 4.4 |

As indicated in Table II, the particle size of the phosphor will decrease irrespective of the potassium anion which is used.

TABLE II

| Salt added | Percent K wt. added | Particle size FSSS |
|---|---|---|
| $KNO_3$ | 0.0 | 8.6 |
| | 0.5 | 7.0 |
| | 1.5 | 5.9 |
| | 2.5 | 5.4 |
| $KNO_2$ | 0.0 | 8.6 |
| | 0.5 | 7.2 |
| | 1.5 | 6.7 |
| | 2.5 | 6.7 |
| $K_2CO_3$ | 0.0 | 8.5 |
| | 0.5 | 6.1 |
| | 1.5 | 4.8 |
| | 2.5 | 4.8 |
| $KClO_4$ | 0.0 | 8.3 |
| | 0.5 | 5.0 |
| | 1.5 | 4.7 |
| | 2.5 | 4.5 |
| $KVO_3$ | 0.0 | 8.0 |
| | 0.5 | 4.6 |
| | 1.5 | 4.6 |
| | 2.5 | 3.9 |

Without limiting this invention the following specific examples are offered as a method of preparing the phosphor.

Example I

Intimately mix the following raw material components including the potassium cation by the usual blending operations such as rolling, tumbling or milling. The phosphor is effectively developed by firing the components in a shallow silica tray at conventional temperatures. After firing the phosphor is washed to remove the potassium cations.

| Materials: | Weight, grams |
|---|---|
| $Y_2(C_2O_4)_3$ | 2713.5 |
| $Eu_2(C_2O_4)_3$ | 169.4 |
| $NH_4VO_3$ | 2810.0 |
| $KClO_4$ | 46.9 |

This method gives both particle size control and narrows particle distribution. The number of oversized and undersized particles is substantially decreased, hence elimination of these results and substantial processing enables the production of a good cathode ray tube screen with a smaller amount of phosphor per unit area.

Example II

An alternate procedure involving wet steps of preparing the $YVO_4$:Eu involves dissolving 51.6 grams of $V_2O_5$ in about 600 cc. of approximately 1 normal KOH. Other bases such as $NH_4OH$ may be used also. Then 25.7 grs. of $Y_2O_3$ and 2.1 grs. of $Eu_2O_3$ are dissolved in approximately 600 cc. of 1 normal HCl. The two solutions are mixed together in a beaker with 100 cc. of water. A yttrium, vanadium, europium compound precipitates out and is fired to produce yttrium vanadate activated by europium. The phosphor is washed to remove the potassium cations.

It is apparent that modifications and changes may be made within the spirit and scope of the invention, but it is our intention however only to be limited by the scope of the appended claims.

As our invention, we claim:

1. In the process for manufacturing a vanadate phosphor, the steps which comprise: mixing together raw materials necessary to form said vanadate phosphor, and adding thereto a potassium cation; firing the mixture and recovering a vanadate phosphor; washing said vanadate phosphor to remove the potassium cations and recovering a phosphor having a particle size less than about 8 microns.

2. The process according to claim 1 wherein the vanadate phosphor is at least one member selected from the group consisting of yttrium and gadolinium.

3. The process according to claim 1 wherein all of the materials necessary to form said vanadate phosphor are dry when mixed together and fired.

4. The process according to claim 1 wherein the materials necessary to form the vanadate phosphor are dissolved and the solutions mixed together before firing.

5. The process according to claim 2 wherein 0.01 to 0.50 gram atoms of potassium cation are mixed with the vanadate phosphor forming raw materials prior to firing.

References Cited

UNITED STATES PATENTS

| | | | |
|---|---|---|---|
| 3,152,085 | 10/1964 | Ballman et al. | 252—301.4 |
| 3,357,925 | 12/1967 | Levine et al. | 252—301.4 |
| 3,380,926 | 4/1968 | Harper | 252—301.4 |

TOBIAS E. LEVOW, *Primary Examiner.*

ROBERT D. EDMONDS, *Assistant Examiner.*